Patented May 11, 1948

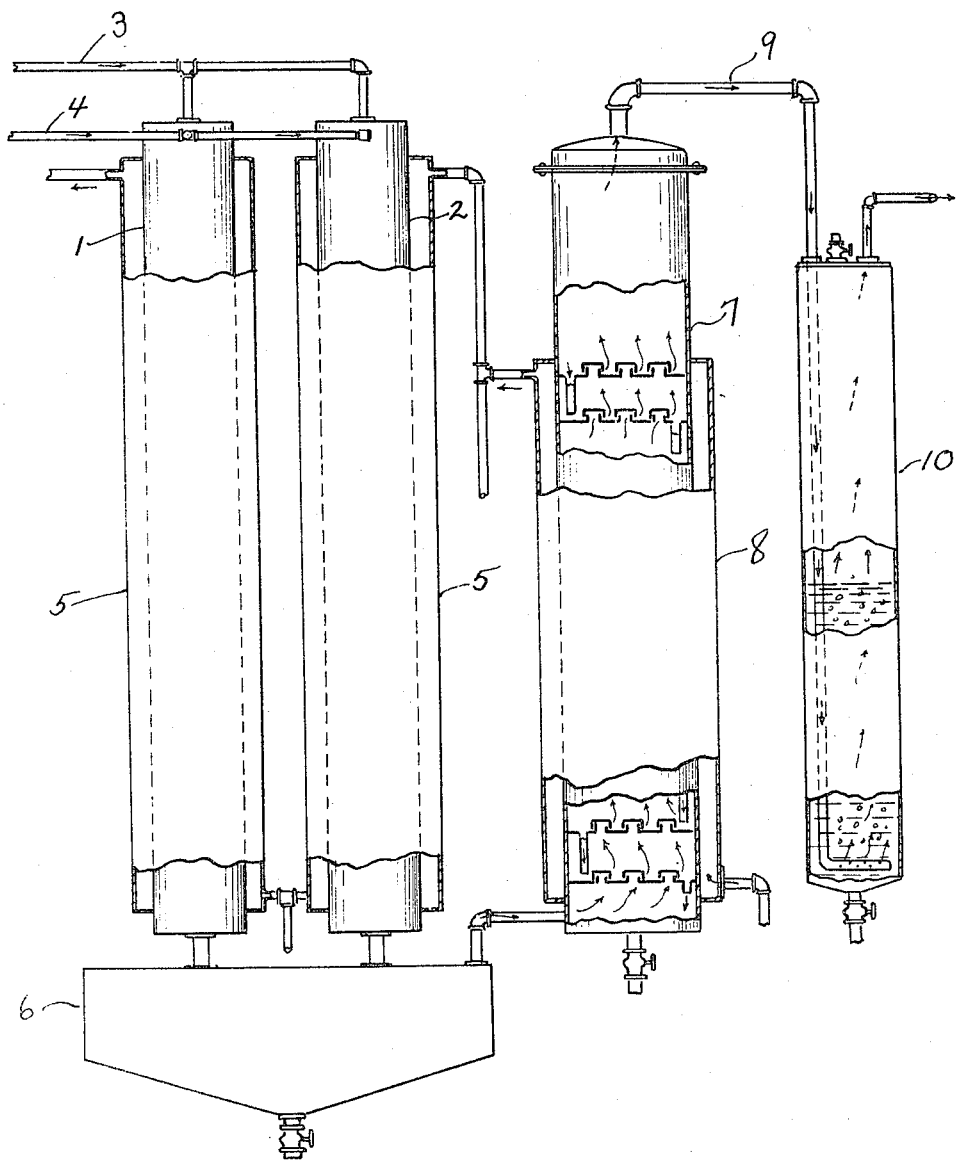

2,441,287

UNITED STATES PATENT OFFICE 2,441,287

PROCESS FOR THE PRODUCTION OF ETHYLENE DICHLORIDE

Alexander S. Ramage, Detroit, Mich., assignor to Albert A. F. Maxwell, Detroit, Mich., as trustee Application September 28, 1944, Serial No. 556,249

2 Claims. (Cl. 260—662)

This invention relates to a process for the production of ethylene dichloride and particularly to the production of ethylene dichloride from petroleum refinery gases.

Refinery gases contain from about 20% to about 45% ethylene and a high percentage of propylene and butylene, the latter two diminishing in quantity as the ethylene increases. Liquefaction of these fractions can be made obtaining the ethylene, propylene and butylene in concentrations over 90%. However, this process is designed rather to take the refinery gases and not proceed with the separation of the ethylene as a liquid running 92% to 99% ethylene. The gases are compressed to about fifty pounds and most of the propylene and butylene are condensed on cooling at these pressures. The balance of the gas containing all the ethylene is passed through a cuprous slurry to eliminate acetylene and butadiene, then through sulfuric acid of 85% strength, both of these solutions being kept at or below 70° F. Practically no ethylene is eliminated. If the gas contains, say, 40% ethylene, it would then contain 400 cubic feet of ethylene per 1000 cubic feet equal to twenty-nine and one-half pounds of ethylene.

The purified gas is then passed through water cooled towers filled with my novel catalyst together with seventy-eight (78) pounds of chlorine at such a rate as to keep the top of the tower below about 110° F. The reaction generates considerable heat and strict attention must be taken to keep the temperature in the towers always 110° F. or lower. With higher temperature there will be more or less substitution products formed. The temperature will determine the rate of flow and the amount of dichloride produced.

Should the purified gas contain less ethylene, say, 30% ethylene which equals 22 pounds of ethylene per 1000 cubic feet, then 58 pounds of chlorine per 1000 cubic feet of gas would be used. The flow will be quicker as the bulk of gas will be greater.

Refining gases from the various cracking processes vary considerable in the amount of ethylene, propylene and butylene running from 20% ethylene as high as 40% to 45%. When the rich gas is used, the heat generated is very great and the flow must be much slower than with a lower percentage of ethylene.

The thus purified refinery gases containing a large amount of ethylene are mixed with chlorine gas in the correct proportion necessary to convert the ethylene into ethylene dichloride. This chlorination of the ethylene is effected in the presence of my novel catalyst which consists of a mixture of finely divided lead, silver and antimony. Preferably the mixture should consist of finely divided lead, silver and antimony in order to obtain an efficient and complete conversion of the ethylene into ethylene dichloride. However, any one or a mixture of two of the above-mentioned metals in finely divided state can be used as a catalyst but with a sacrifice in the efficiency of the process. The preferred mixture of finely divided metals comprises about 63% lead, 16% silver and the balance antimony. However, the proportion of these metals can be varied over a wide range. These metal catalysts can be converted or formed into a finely divided state according to numerous known methods. However, I prefer forming these catalysts as follows: First, I take 900 grams of long fiber asbestos and mix well with 150 grams of zinc dust. Then a solution of 720 grams of lead acetate in water is added. The lead separates out immediately in a very fine spongy state. Second, I take 400 grams of long fiber asbestos and add 170 grams of silver nitrate in solution and reduce the same with formaldehyde and caustic soda. Third, I take 400 grams of long fiber asbestos and mix the same with 65 grams of zinc dust. To this I add a solution of 228 grams antimony trichloride slightly acidified with hydrochloric acid. Immediately the antimony is liberated in a very fine state of subdivision. The three catalysts are added or mixed together, well washed, drained and then dried in a current of hydrogen heated to 400° F. The total will give 2306 grams of catalyst. The analysis when dry will show 70% asbestos and 30% of metal. The analysis of the metal will be 63.36% lead, 16.5% silver, 20.14% antimony.

In the drawing I have shown diagrammatically the apparatus used for practicing my process.

In the drawing 1 and 2 are two lead tubes or cylinders which are filled with the above described catalytic mixture of lead, silver and antimony. The asbestos serves as an inert support or carrier for the finely divided or amorphous lead, silver and antimony so that the ethylene and chlorine and the reaction products can flow through the tubes in intimate contact with the catalyst. To prevent packing of the catalyst small lumps of pumice or fire brick can be mixed in with the asbestos and catalyst to allow an easy flow of gas through the tubes. Where the tubes or towers 1 and 2 are exceptionally large, perforated shelves can be used every foot or two for supporting the asbestos coated catalyst and thereby prevent packing of the same. The refinery gas containing ethylene is conducted to tubes 1 and 2 by pipe 3 and the chlorine by pipe 4. Cylinders 1 and 2 are covered by a jacket 5 through which a stream of coolant, such as water, flows to control the reaction temperature so that it does not exceed 110° F. The ethylene dichloride formed in tubes 1 and 2 condenses and flows into tank or reservoir 6 and the gases pass on into bell tower 7 which is also surrounded by a jacket 8 through which flows a coolant, such as water. In the bell tower 7 the dichloride present in the gas is washed out and the gas then flows through pipe 9 into tank 10 in which it is bubbled through water to wash any trace of dichloride or acid out of the spent gas. With cylinders 1 and 2 eight feet long and one foot in diameter, the capacity of the unit will run about 450 gallons of ethylene dichloride per day.

I claim:

1. A process for producing ethylene dichloride comprising reacting ethylene and chlorine in the presence of a catalyst comprising essentially amorphous lead, silver, and antimony.

2. The process as set forth in claim 1 wherein the catalyst comprises essentially by weight approximately 63% lead, 16% silver, and the balance antimony.

ALEXANDER S. RAMAGE.

REFERENCES CITED

The following references are of record in the file of this patent:

UNITED STATES PATENTS

| Number | Name | Date |
|---|---|---|
| 1,851,970 | Askenasy et al. | Apr. 5, 1932 |
| 1,871,117 | Day | Aug. 9, 1932 |

OTHER REFERENCES

Dobriansky et al., "Trans. State Inst. Applied Chem." (U. S. S. R.), vol. 24, pages 21–31 (1935).